Apr. 3, 1923.
R. M. ANDERSON
PLOW FENDER
Filed Mar. 5, 1921
1,450,828
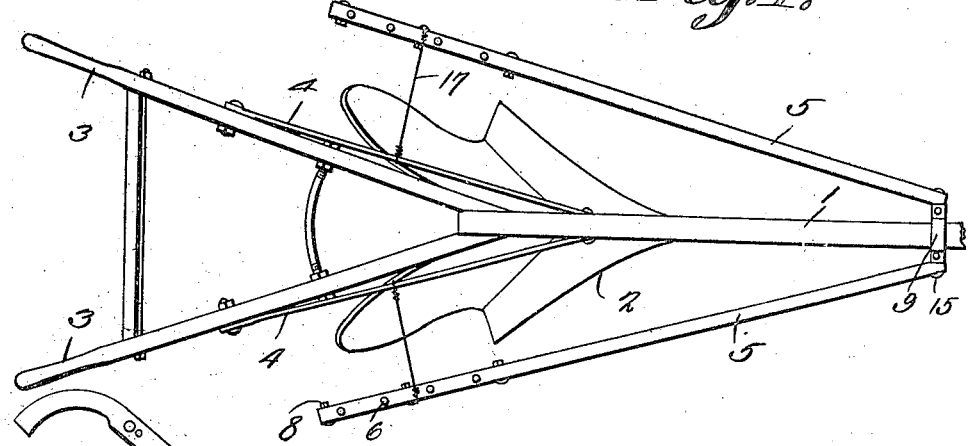
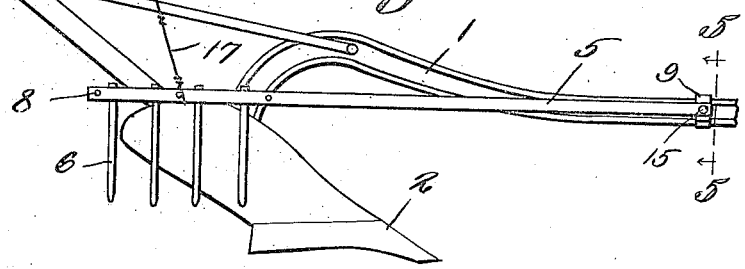
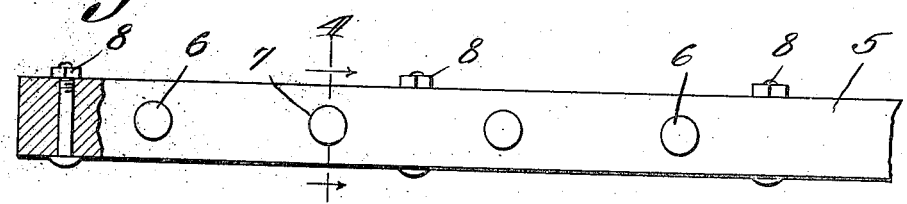
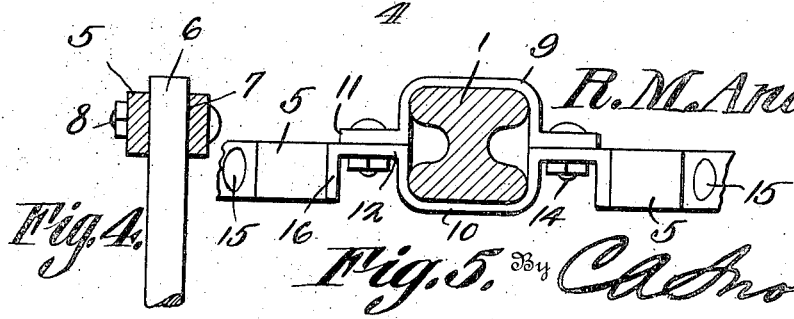
R. M. Anderson
Inventor
By Cashow & Co.
Attorneys Patented Apr. 3, 1923.

1,450,828

UNITED STATES PATENT OFFICE.

ROBERT M. ANDERSON, OF COMO, MISSISSIPPI.

PLOW FENDER.

Application filed March 5, 1921. Serial No. 449,924.

*To all whom it may concern:*

Be it known that I, ROBERT M. ANDERSON, a citizen of the United States, residing at Como, in the county of Panola and State of Mississippi, have invented a new and useful Plow Fender, of which the following is a specification.

The device forming the subject matter of this application is a fender for a plow, the fender being so constructed that when the plow is run along a row for standing plants, the large clods and grass will be held back, permitting nothing but relatively fine dirt to sift through upon the plants.

The invention aims to provide a fender of the kind mentioned which can be manufactured out of inexpensive materials, a simple but efficient means being provided for connecting the fender with the plow.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings:—

Figure 1 shows in top plan, a plow equipped with the device forming the subject matter of this application; Figure 2 is a side elevation of the plow, the fender being applied thereto; Figure 3 is a fragmental top plan showing the rear end of the fender, a part thereof being in section; Figure 4 is a section taken approximately on the line 4—4 of Figure 3; and Figure 5 is a section on the line 5—5 of Figure 2.

The device forming the subject matter of this application is adapted to be applied to a plow of any desired sort, that is, either a turning plow, or a middleburster. In the present embodiment of the invention, the device is shown as applied to a middleburster, comprising a beam 1, a share 2, handles 3, and braces 4 extended between the handles and the beam. In carrying out the invention bars 5 are provided, the bars preferably being made of wood, for the sake of lightness and cheapness. At their rear ends, the bars 5 are supplied with depending teeth 6, which may be in the form of wooden pins, fitting tightly in openings 7 formed in the bar 5. In order to strengthen the bar 5 and to prevent the splitting thereof, securing devices 8 or bolts are mounted in the bar adjacent to the rear end thereof, one bolt 8 being mounted in the extreme rear end of the bar, another of the bolts being mounted in the bar in advance of the teeth 6, and another of the bolts passing through the bar, between certain of the teeth.

Any suitable means may be provided for attaching the forward end of the bars 5, pivotally, to the plow beam 1. In the present embodiment of the invention, a clamp is provided for the purpose above alluded to, the clamp comprising an upper member 9 and a lower member 10, receiving the beam 1, the upper member having lateral flanges 11, cooperating with lateral flanges 12 on the lower member 10, the flanges of the lower member having depending lips 16. Securing devices 14 unite the flanges 11 and 12 and hold the clamp on the beam 1. The forward ends of the braces 14 are mounted for vertical swinging movement on pivot elements 15 carried by the lips 16. Adjacent to their rear ends, the bars 5 are connected by ties 17 with some portion of the plow, preferably with the braces 4. The ties 17 are flexible, and may be pieces of wire if desired.

In practical operation, the teeth 6 ride over the soil as it is turned, practically all of the weight of the bars 5 being carried by the soil, the function of the ties 17 being to prevent the rear ends of the bars 5 from spreading apart too widely. Owing to the construction of the device, large clods and grass will be prevented from being cast laterally on the standing plants, and only finely divided dirt will pass to the plants.

Although the bars 5 are shown in the drawings as mounted on a middleburster, it will be clear that one bar only may be used, when the plow is in the form of a turning plow, embodying a mold board and a landside.

It is to be observed that the nuts which form the detachable parts of the connections represented by the bolts 14, are housed between the lower members 10 of the clamps and the depending lips 16, an accidental detachment of the nuts being not likely to occur.

Having thus described the invention, what is claimed is:—

A plow comprising a share, and a frame including a beam; a clamp embracing the beam and including upper and lower members having laterally projecting flanges, one flange of the lower member being provided with a depending lip disposed at an angle to the length of the beam; a securing device connecting the flanges of the upper and lower members and comprising a detachable part housed between the lower member and the lip; a bar extended along the lip; a pivot element connecting the bar with the lip for vertical swinging movement; a tie extended between the rear portion of the bar and the frame; and depending teeth carried by the rear end of the bar and located adjacent to the share.

In testimony that I claim the foregoing as my own, I have hereto affixed my signature in the presence of two witnesses.

ROBERT M. ANDERSON.

Witnesses:
M. P. HARDIN,
E. B. BLALOCK.